(12) United States Patent
Kano et al.

(10) Patent No.: US 9,026,933 B2
(45) Date of Patent: May 5, 2015

(54) INFORMATION PROCESSING APPARATUS, PARAMETER SETTING METHOD, AND PROGRAM

(75) Inventors: Ritsuko Kano, Tokyo (JP); Yoshihito Ohki, Tokyo (JP); Akihiro Komori, Tokyo (JP); Reiko Miyazaki, Tokyo (JP)

(73) Assignee: Sony Corporation, Tokyo (JP)

( * ) Notice: Subject to any disclaimer, the term of this patent is extended or adjusted under 35 U.S.C. 154(b) by 958 days.

(21) Appl. No.: 13/170,571

(22) Filed: Jun. 28, 2011

(65) Prior Publication Data

US 2012/0054665 A1    Mar. 1, 2012

(30) Foreign Application Priority Data

Aug. 30, 2010    (JP) .................................. 2010-192249

(51) Int. Cl.
*G06F 3/048* (2013.01)
*G06F 3/0488* (2013.01)
*G06F 3/0484* (2013.01)

(52) U.S. Cl.
CPC ........ *G06F 3/04883* (2013.01); *G06F 3/04847* (2013.01)

(58) Field of Classification Search
CPC ....................................................... G06F 3/048
USPC ........................................ 715/776; 345/156
See application file for complete search history.

(56) References Cited

U.S. PATENT DOCUMENTS

| | | | | |
|---|---|---|---|---|
| 5,420,607 | A * | 5/1995 | Miller et al. ................... | 345/156 |
| 6,252,182 | B1 * | 6/2001 | Lai .............................. | 178/19.04 |
| 6,603,463 | B1 * | 8/2003 | Rising, III .................... | 345/179 |
| 2003/0117408 | A1 * | 6/2003 | Forsline et al. ............... | 345/581 |
| 2006/0148527 | A1 * | 7/2006 | Blount ........................... | 455/566 |
| 2010/0141603 | A1 * | 6/2010 | Hotelling ....................... | 345/173 |
| 2011/0050588 | A1 * | 3/2011 | Li et al. ......................... | 345/173 |
| 2011/0050594 | A1 * | 3/2011 | Kim et al. ..................... | 345/173 |
| 2011/0298709 | A1 * | 12/2011 | Vaganov ........................ | 345/158 |

FOREIGN PATENT DOCUMENTS

JP    2008-192092    8/2008

* cited by examiner

*Primary Examiner* — Matthew Ell
(74) *Attorney, Agent, or Firm* — Oblon, McClelland, Maier & Neustadt, L.L.P.

(57) ABSTRACT

There is provided an information processing apparatus including a position detection unit for detecting a contact position of an operating tool which has contacted a screen, an area size detection unit for detecting a contact area size of the operating tool which has contacted the screen, a pressure detection unit for detecting a pressure of the operating tool pressing the screen, and a parameter setting unit for setting, according to the contact area size of the operating tool on an object for parameter setting displayed on the screen and the pressure of the operating tool pressing the object, a size of a parameter associated with the object.

8 Claims, 20 Drawing Sheets

(INK SCOOP-UP OPERATION: CHANGE IN AREA SIZE)

(INK SCOOP-UP OPERATION: CHANGE IN PRESSURE)

FIG.9 (DRAWING OPERATION: CHANGE IN DENSITY)

(DRAWING OPERATION: CHANGE IN DENSITY)

(DRAWING OPERATION: CHANGE IN DENSITY)

FIG.17
(DRAWING OPERATION: SEEPING)
Step 1: OPERATION
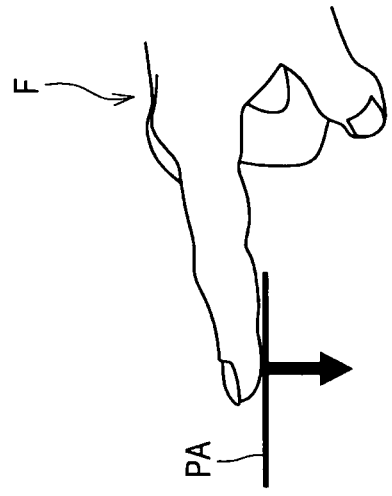
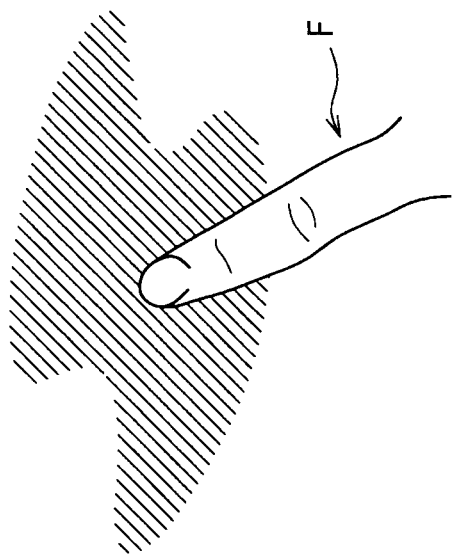
Step 2: ACTION

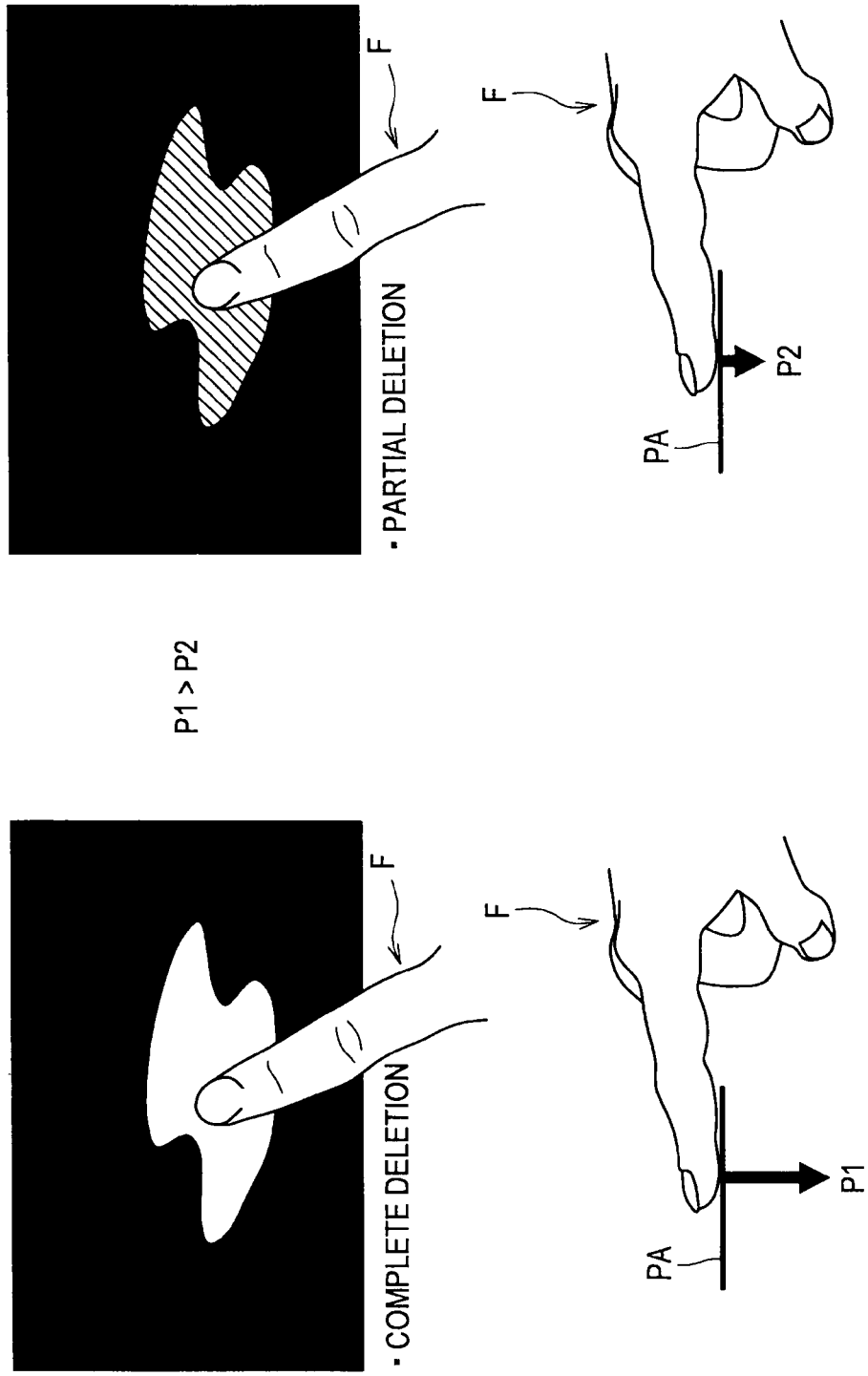

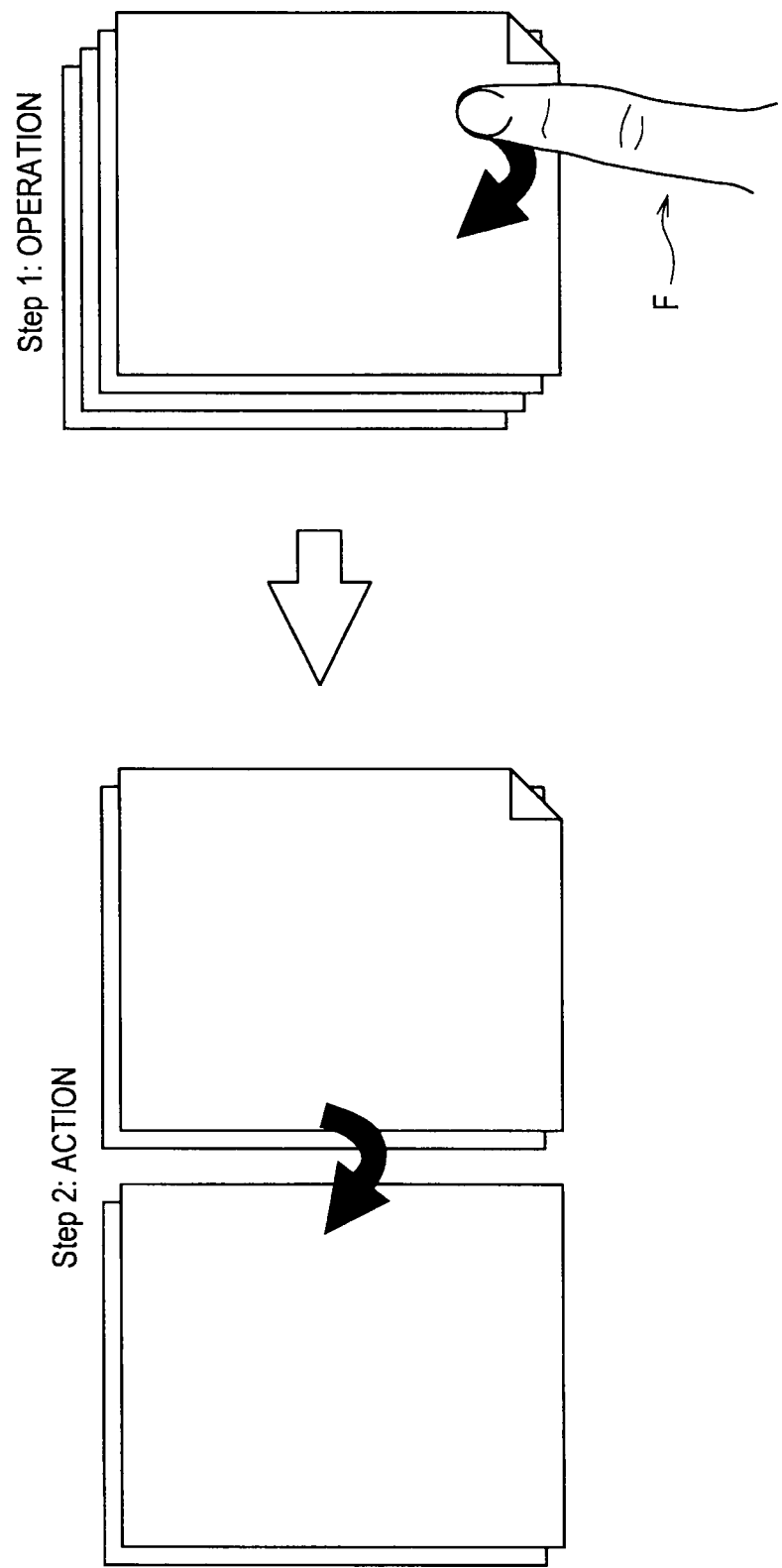

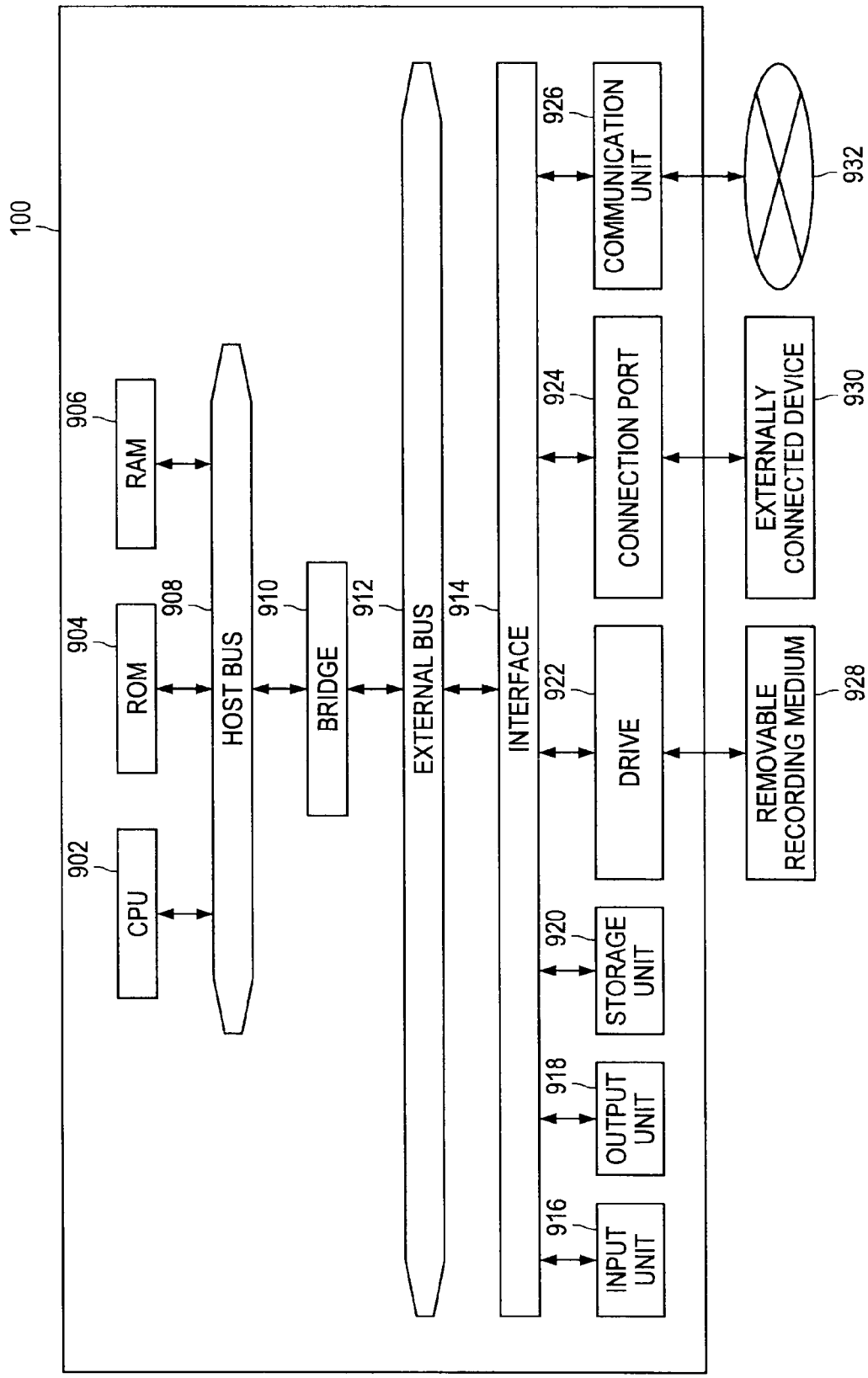

INFORMATION PROCESSING APPARATUS, PARAMETER SETTING METHOD, AND PROGRAM

BACKGROUND

The present disclosure relates to an information processing apparatus, a parameter setting method, and a program.

In recent years, many small electronic appliances are provided with a touch panel as an input device used for inputting information or performing operation of a graphical user interface (hereinafter, a GUI). By using a touch panel, separate input means such as a keyboard becomes unnecessary, and an electronic appliance can be made smaller to that extent. Furthermore, the touch panel is also a display device on which an image, the GUI or the like is displayed. Accordingly, by using the touch panel, an intuitive operation system of directly touching and operating the image, the GUI or the like displayed on the touch panel can be realized. Owing to these characteristics, the touch panel is provided in various electronic appliances such as a portable information terminal, a mobile phone, a car navigation system, a notebook personal computer and an information appliance, for example.

As described, the touch panel has a function of an input device and a function of a display device. The function of a display device is realized by using a display panel such as a liquid crystal display panel (hereinafter, an LCD panel), an organic electro-luminescent display panel (hereinafter, an OLED panel) or the like, for example. On the other hand, the function of an input device is realized by providing, on a display panel, a capacitive sensor or an optical sensor which is for optically scanning the position of an operating tool that is neared or brought into contact with the surface of the display panel, for example. For example, JP 2008-192092A discloses, in relation to such a touch panel, a technology related to a touch panel capable of detecting the intensity of pressure (hereinafter, a pressure-sensitive touch panel).

SUMMARY

As described above, a pressure-sensitive touch panel can detect the position of an operating tool which has touched the touch panel and its pressure. Accordingly, by using the pressure-sensitive touch panel, a press-down operation by the operating tool can be detected. As a result, in addition to existing operation methods such as a tap operation and a drag operation, an operation method called a press-down operation becomes possible to be used, and it is assumed that a more convenient operation system will be realized. However, in reality, it is hard to say that a highly convenient operation system that makes use of the property of the pressure-sensitive touch panel is realized.

In light of the foregoing, it is desirable to provide an information processing apparatus, a parameter setting method and a program which are novel and improved, and which are capable of realizing a highly convenient operation system that makes use of the property of the pressure-sensitive touch panel.

According to an embodiment of the present disclosure, there is provided an information processing apparatus which includes a position detection unit for detecting a contact position of an operating tool which has contacted a screen, an area size detection unit for detecting a contact area size of the operating tool which has contacted the screen, a pressure detection unit for detecting a pressure of the operating tool pressing the screen, and a parameter setting unit for setting, according to the contact area size of the operating tool on an object for parameter setting displayed on the screen and the pressure of the operating tool pressing the object, a size of a parameter associated with the object.

The parameter setting unit may set the parameter to be larger as the contact area size of the operating tool on the object for parameter setting is larger and set the parameter to be larger as the pressure of the operating tool pressing the object is higher.

The parameter setting unit may set, as the parameter, an amount proportional to an integral value I obtained by integrating, with respect to a time t during which the object for parameter setting is being contacted, a product S(t)*P(t) of a contact area size S(t) of the operating tool on the object and a pressure P(t) of the operating tool pressing the object.

The object for parameter setting may be provided for each colour, and the parameter may be an amount of ink assumed to have been attached to the operating tool which contacted the object in a case the operating tool contacted the object for parameter setting.

The information processing apparatus may further include a drawing unit for drawing, in a case the operating tool contacts a drawing area on the screen, a dot at a contact position of the operating tool with a density according to the amount of ink assumed to have been attached to the operating tool. In this case, the parameter setting unit decreases the amount of ink assumed to have been attached to the operating tool every time a dot is drawn by the drawing unit, and the drawing unit decreases the density of a dot to be drawn in the drawing area every time the amount of ink assumed to have been attached to the operating tool is decreased.

The drawing unit may make the dot to be drawn in the drawing area larger as the contact area size of the operating tool is larger and increase the density of the dot to be drawn in the drawing area as the pressure of the operating tool is higher, and the parameter setting unit may greatly decrease the amount of ink assumed to have been attached to the operating tool as the dot drawn in the drawing area is larger and greatly decrease the amount of ink assumed to have been attached to the operating tool as the dot drawn in the drawing area is denser.

The drawing unit may decrease the density of the dot to be drawn in the drawing area as a speed of movement of the operating tool is greater.

In addition to the object for parameter setting provided for each colour, an object for parameter setting for deleting the dot drawn in the drawing area may be provided on the screen, and, in a case the operating tool contacts the dot drawn in the drawing area after the operating tool contacts the object for parameter setting for deleting the dot, the drawing unit may lighten a colour of the dot at the contact position of the operating tool or delete the dot according to the pressure of the operating tool.

The information processing apparatus may further include a book display unit for causing a digital book having a plurality of pages to be displayed on the screen, and a page-turning unit for turning, when an action of turning the pages is performed by the operating tool, the pages by a number of pages according to the size of a parameter set by the parameter setting unit.

According to another embodiment of the present disclosure, there is provided a parameter setting method performed by an information processing apparatus including a position detection unit for detecting a contact position of an operating tool which has contacted a screen, an area size detection unit for detecting a contact area size of the operating tool which has contacted the screen, and a pressure detection unit for detecting a pressure of the operating tool pressing the screen, which includes setting, according to the contact area size of the operating tool on an object for parameter setting displayed on the screen and the pressure of the operating tool pressing the object, a size of a parameter associated with the object.

According to another embodiment of the present disclosure, there is provided a program for causing a computer to realize a position detection function of detecting a contact position of an operating tool which has contacted a screen, an area size detection function of detecting a contact area size of the operating tool which has contacted the screen, a pressure detection function of detecting a pressure of the operating tool pressing the screen, and a parameter setting function of setting, according to the contact area size of the operating tool on an object for parameter setting displayed on the screen and the pressure of the operating tool pressing the object, a size of a parameter associated with the object.

According to another embodiment of the present disclosure, there is provided a computer-readable recording medium in which the program is recorded.

According to the embodiments of the present disclosure described above, it is possible to realize a highly convenient operation system that makes use of the property of the pressure-sensitive touch panel.

BRIEF DESCRIPTION OF THE DRAWINGS

FIG. 17 is an explanatory diagram for describing the drawing operation according to the embodiment;

FIG. 18 is an explanatory diagram for describing a delete operation according to the embodiment;

FIG. 19 is an explanatory diagram for describing a page-turning operation of an example application of the embodiment; and FIG. 20 is an explanatory diagram for describing a hardware configuration capable of realizing a function of the information processing apparatus according to the embodiment.

DETAILED DESCRIPTION OF THE EMBODIMENT(S)

Figure 1:
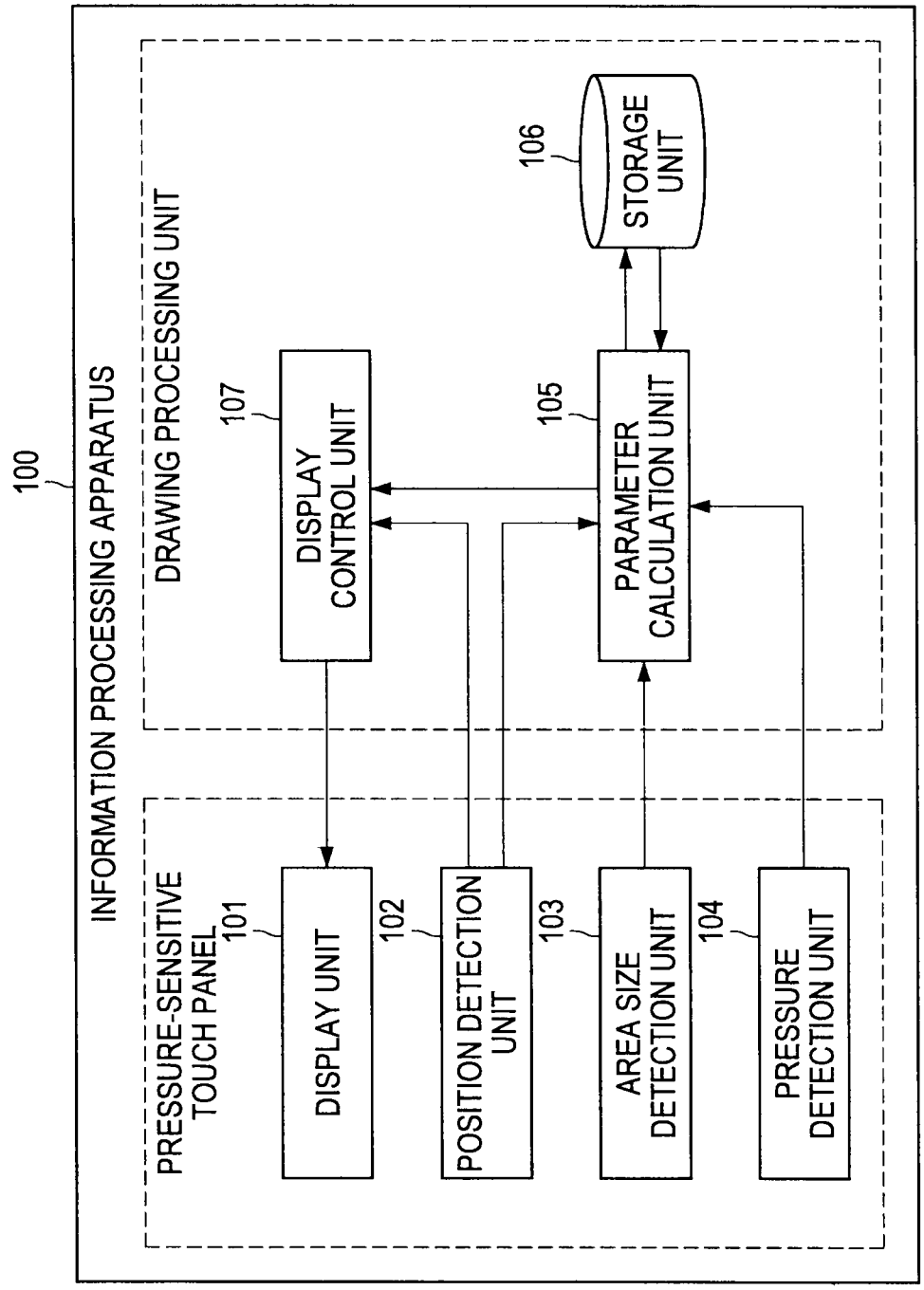
FIG. 1 is an explanatory diagram for describing a functional configuration of an information processing apparatus according to an embodiment of the present disclosure.

Hereinafter, preferred embodiments of the present disclosure will be described in detail with reference to the appended drawings. Note that, in this specification and the appended drawings, structural elements that have substantially the same function and configuration are denoted with the same reference numerals, and repeated explanation of these structural elements is omitted.

[Flow of Explanation]

The flow of explanation on an embodiment of the present disclosure which will be described below will be briefly stated here. First, a functional configuration of an information processing apparatus 100 according to the embodiment will be described with reference to FIG. 1. Next, a configuration of an execution screen of a drawing application according to the embodiment will be described with reference to FIG. 2. Then, an ink scoop-up operation according to the embodiment will be described with reference to FIGS. 3 to 8.

Next, a drawing operation according to the embodiment will be described with reference to FIGS. 9 to 18. Then, a page-turning operation according to an example application of the embodiment will be described with reference to FIG. 19. Then, a hardware configuration capable of realizing a function of the information processing apparatus 100 according to the embodiment will be described with reference to FIG. 20. Lastly, technical ideas of the embodiment will be summarized and effects obtained by the technical ideas will be briefly described.

(Description Items)

1: Embodiment 1-1: Functional Configuration of Information Processing Apparatus 100

1-2: Configuration of Execution Screen of Drawing Application 1-3: Ink Scoop-Up Operation 1-4: Drawing Operation 1-5: Delete Operation 2: Example Application 3: Hardware Configuration 4: Summary <1: Embodiment>

An embodiment of the present disclosure will be described. The present embodiment relates to a technology for realizing a highly convenient operation system by using a pressure-sensitive touch panel. In the following, explanation will be given taking a drawing application as an example.

[1-1: Functional Configuration of Information Processing Apparatus 100]

First, a functional configuration of an information processing apparatus 100 according to the present embodiment will be described with reference to FIG. 1. FIG. 1 is an explanatory diagram for describing a functional configuration of the information processing apparatus 100 according to the present embodiment.

As shown in FIG. 1, the information processing apparatus 100 is configured mainly from a display unit 101, a position detection unit 102, an area size detection unit 103, a pressure detection unit 104, a parameter calculation unit 105, a storage unit 106, and a display control unit 107. Furthermore, the display unit 101, the position detection unit 102, the area size detection unit 103, and the pressure detection unit 104 form a pressure-sensitive touch panel. The function of this pressure-sensitive touch panel is realized by a touch panel provided with a capacitive sensor or an optical sensor, for example. Furthermore, the parameter calculation unit 105, the storage unit 106, and the display control unit 107 form a drawing processing unit.

The display unit 101 is display means for displaying an image. For example, the display unit 101 displays, in response to control by the display control unit 107, a background image, an object used for operation, a drawn image, or the like (for example, see FIG. 2). The position detection unit 102 is means for detecting the position of an operating tool F which has neared or contacted the pressure-sensitive touch panel. Information on the position detected by the position detection unit 102 is input to the parameter calculation unit 105 and the display control unit 107.

The area size detection unit 103 is means for detecting a contact area size of the operating tool F which has contacted the pressure-sensitive touch panel. Information on the contact area size detected by the area size detection unit 103 is input to the parameter calculation unit 105. The pressure detection unit 104 is means for detecting the pressure of the operating tool F pressing the pressure-sensitive touch panel. Information on the pressure detected by the pressure detection unit 104 is input to the parameter calculation unit 105.

As described, the position information indicating the position of the operating tool F, the area size information indicating the contact area size of the operating tool F, and the pressure information indicating the pressure of the operating tool F are input to the parameter calculation unit 105. When these pieces of information are input, the parameter calculation unit 105 selects the type of a parameter to be calculated or calculates the movement velocity of the operating tool F, based on the position information, for example. Also, the parameter calculation unit 105 calculates a parameter based on the movement velocity, the area size information, and the pressure information of the operating tool F.

A parameter calculated by the parameter calculation unit 105 is recorded in the storage unit 106. Furthermore, velocity information indicating the movement velocity of the operating tool F and a parameter calculated by the parameter calculation unit 105 are input to the display control unit 107. When a parameter is input, the display control unit 107 causes the display unit 101 to display an image, based on the input parameter. For example, in the case of a drawing application, the display control unit 107 causes a dot of the colour and diameter according to the parameter input from the parameter calculation unit 105 to be displayed at a position indicated by the position information input by the position detection unit 102.

In the foregoing, a functional configuration of the information processing apparatus 100 has been described. Additionally, each operation result of the drawing application described later is realized by a function of the information processing apparatus 100.

[1-2: Configuration of Execution Screen of Drawing Application]

Figure 2:
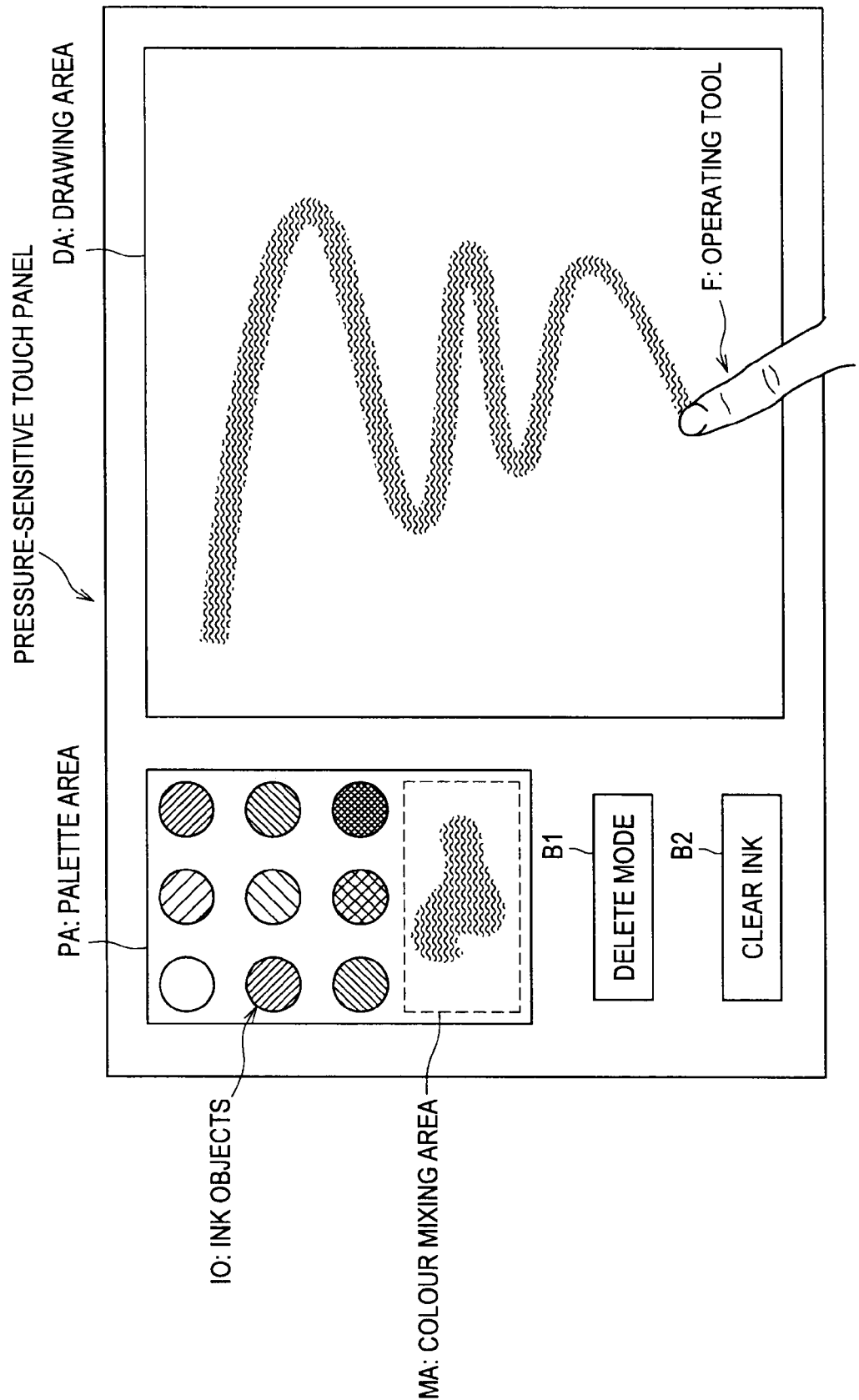
FIG. 2 is an explanatory diagram for describing a configuration of an execution screen of a drawing application according to the embodiment.

Next, a configuration of an execution screen of a drawing application according to the present embodiment will be described with reference to FIG. 2. FIG. 2 is an explanatory diagram for describing a configuration of an execution screen of a drawing application according to the present embodiment. Additionally, the screen configuration of FIG. 2 is only an example, and the present embodiment is not limited to such. For example, arrangement, shape or the like of objects may be freely changed. However, explanation will be given here keeping in mind a drawing application having a screen configuration illustrated in FIG. 2.

As shown in FIG. 2, the execution screen of this drawing application includes a palette area PA, a drawing area DA, a delete mode button B1, and a clear ink button B2. Also, a plurality of ink objects IO, and a colour mixing area MA are provided in the palette area PA.

The palette area PA is an area for attaching ink to the operating tool F. For example, when the operating tool F touches an ink object IO, it is assumed that ink of the colour corresponding to the touched ink object IO becomes attached to the operating tool F. Furthermore, the drawing area DA is an area for drawing a picture by using the ink attached to the operating tool F. When the operating tool F touches the drawing area DA, a dot of the colour attached to the operating tool F is drawn at the position of the operating tool F. Accordingly, when the operating tool F is moved while in contact with the drawing area DA, a line is drawn in the track of the operating tool F.

Furthermore, to delete the picture drawn in the drawing area DA, the delete mode button B1 is pressed to move to a delete mode, and the picture drawn in the drawing area DA is rubbed by the operating tool F. When the picture is rubbed by the operating tool F in the delete mode, the colour of the part rubbed by the operating tool F becomes pale or is completely deleted. Furthermore, to wipe off the ink attached to the operating tool F, the clear ink button B2 is pressed and the operating tool F will return to the state where no ink is attached thereto. Furthermore, to mix ink colours, the ink attached to the operating tool F is put on the colour mixing area MA and another ink is attached to the operating tool F to perform mixing on the colour mixing area MA, thereby mixing the ink colours.

In the foregoing, a configuration of the execution screen of the drawing application according to the present embodiment has been described. However, explanation on the contents of processes to be performed by the information processing apparatus 100 at the time of attaching ink to the operating tool F, a calculation method of the amount of ink to be attached to the operating tool F, and the like has been omitted. Also, explanation on the contents of processes to be performed by the information processing apparatus 100 at the time of drawing, the change in the amount of ink attached to the operating tool F, the change in the density of a dot or line according to the change in the amount of ink, and the like has been omitted. These points will be described in detail in the following.

[1-3: Ink Scoop-Up Operation]

First, an ink scoop-up operation by the operating tool F will be described with reference to FIGS. 3 to 8. As described above, in the drawing application according to the present embodiment, an operation method of attaching ink to the operating tool F and drawing a picture in the drawing area DA is adopted. Particularly, the drawing application according to the present embodiment has one characteristic in an operation method of attaching ink to the operating tool F by scooping up ink from the ink object IO. Accordingly, the ink scoop-up operation by the operating tool F will be described in detail in the following.

Figure 3:
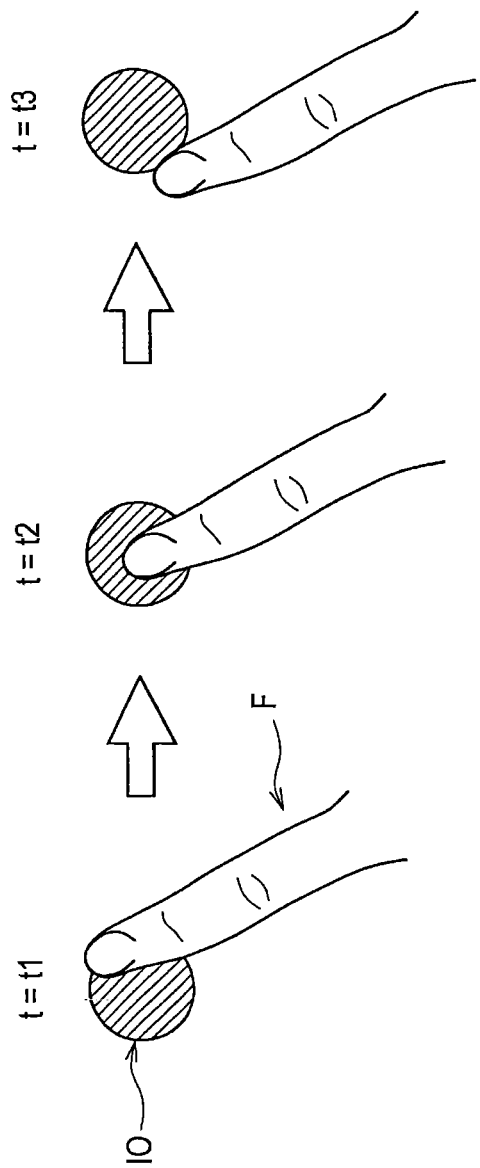
FIG. 3 is an explanatory diagram for describing an ink scoop-up operation according to the embodiment.

First, FIG. 3 will be referred to. As shown in FIG. 3, at the time of attaching ink to the operating tool F, a user moves the operating tool F in such a way as to sweep across the ink object IO. At this time, the position of the operating tool F is detected by the position detection unit 102. Then, the position information of the operating tool F detected by the position detection unit 102 is input to the parameter calculation unit 105. When the position information of the operating tool F is input, the parameter calculation unit 105 selects a colour of ink to be attached to the operating tool F based on the positional relationship between the position of the ink object IO provided for each colour and the operating tool F.

Furthermore, when the ink object IO is swept across by the operating tool F, the area size detection unit 103 detects the area size of the contact between the operating tool F and the ink object IO. Then, pieces of area size information indicating the area sizes detected by the area size detection unit 103 are sequentially input to the parameter calculation unit 105. Likewise, when the ink object IO is swept across by the operating tool F, the pressure detection unit 104 detects the pressure of the operating tool F pressing the pressure-sensitive touch panel. Then, pieces of pressure information indicating the pressures detected by the pressure detection unit 104 are sequentially input to the parameter calculation unit 105.

Figure 4:
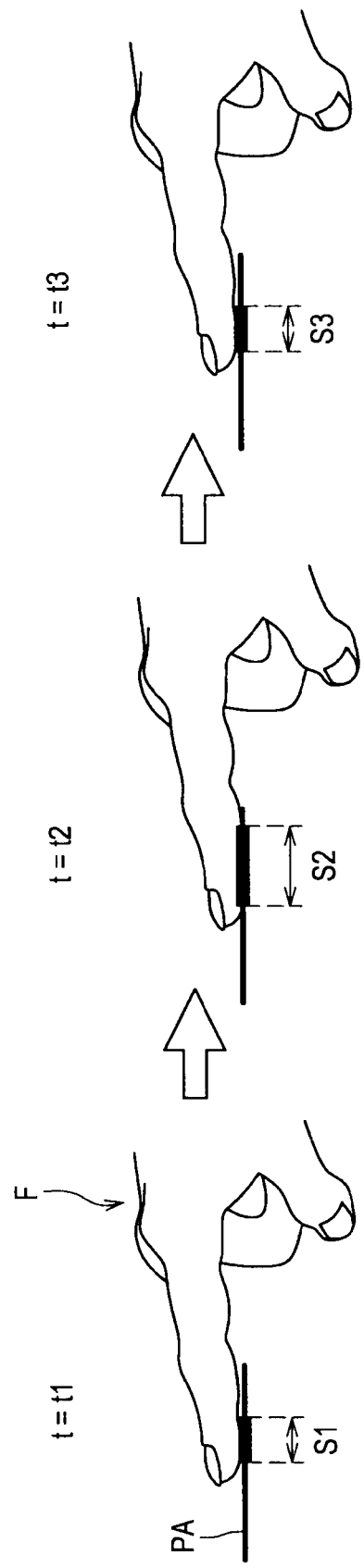
FIG. 4 is an explanatory diagram for describing the ink scoop-up operation according to the embodiment.

In the case of the operation of scooping up the ink, an area size S of contact between the ink object IO and the operating tool F changes in the manner as shown in FIG. 4. For example, the area size S of contact between the ink object IO and the operating tool F is small immediately after the scoop-up operation is started (time t=t1, area size S=S1), but increases as the operating tool F nears the centre of the ink object IO (t=t2, area size S=S2), and decreases as it nears the edge of the ink object IO (t=t3, area size S=S3) (S1<S2, S2>S3). That is, the contact area size S between the operating tool F and the ink object 10 changes in the manner as shown in FIG. 5.

Figure 6:
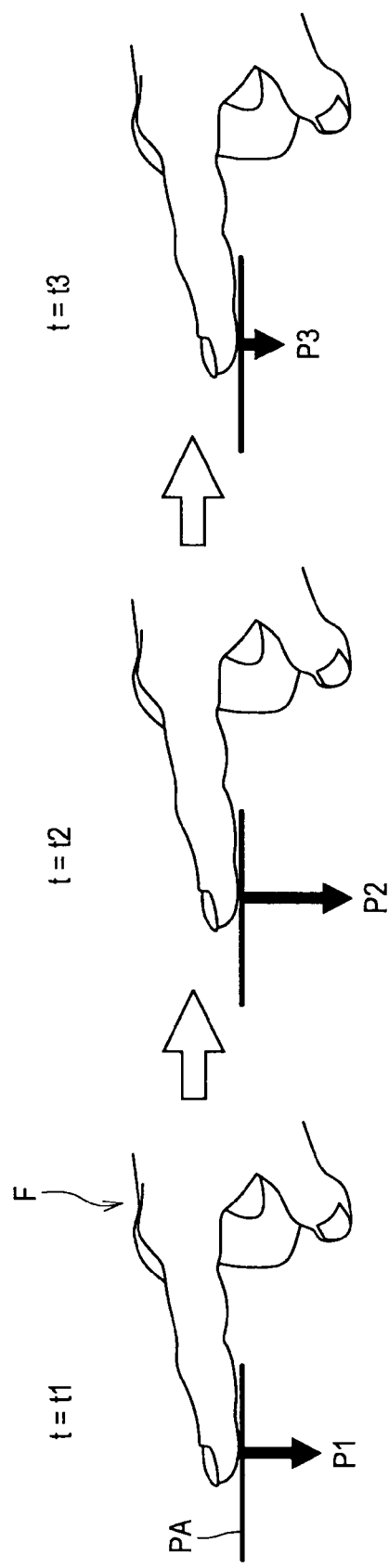
FIG. 6 is an explanatory diagram for describing the ink scoop-up operation according to the embodiment.
Figure 7:
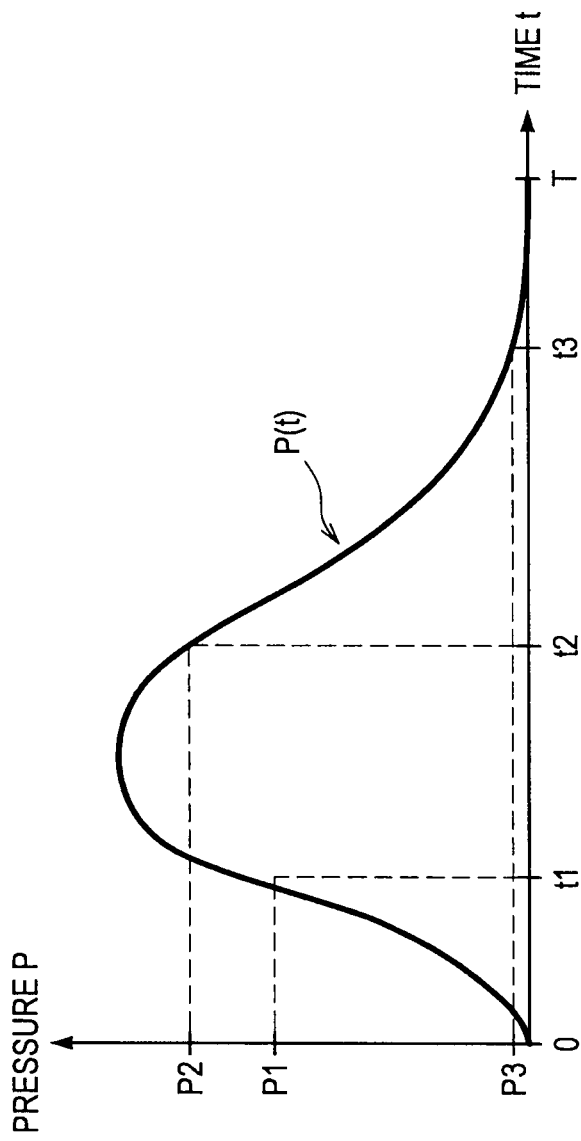
FIG. 7 is an explanatory diagram for describing the ink scoop-up operation according to the embodiment.

Furthermore, in the case of the operation of scooping up the ink, a pressure P of the operating tool F pressing the ink object IO changes in the manner as shown in FIG. 6. For example, the pressure P of the operating tool F pressing the ink object IO is small immediately after the scoop-up operation is started (time t=t1, pressure P=P1), but increases as the operating tool F nears the centre of the ink object IO (t=t2, pressure P=P2), and decreases as it nears the edge of the ink object IO (t=t3, pressure P=P3) (P1<P2, P2>P3). That is, the pressure P of the operating tool F pressing the ink object IO changes in the manner as shown in FIG. 7.

Figure 5:
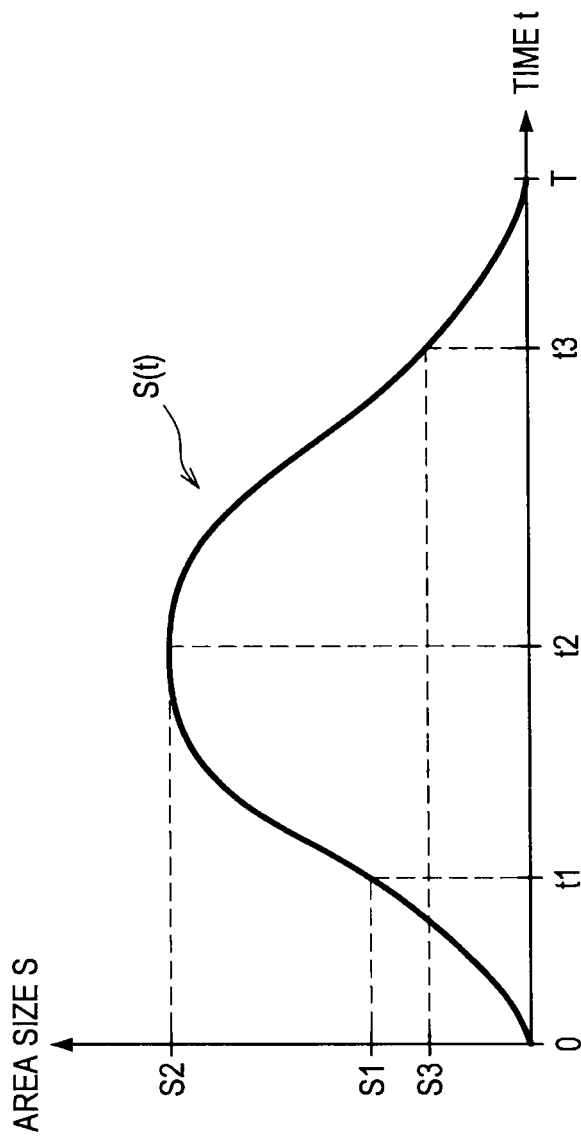
FIG. 5 is an explanatory diagram for describing the ink scoop-up operation according to the embodiment.

When the ink scoop-up operation is performed, the area size S that changes in the manner as shown in FIG. 5 is detected by the area size detection unit 103. Furthermore, when the ink scoop-up operation is performed, the pressure P that changes in the manner as shown in FIG. 7 is detected by the pressure detection unit 104. Pieces of area size information indicating the area sizes S detected by the area size detection unit 103 and pieces of pressure information indicating the pressures P detected by the pressure detection unit 104 are sequentially input to the parameter calculation unit 105. When the area size information and the pressure information are input, the parameter calculation unit 105 calculates the amount of ink assumed to have been attached to the operating tool F, based on the input area size information and pressure information. This amount of ink is an example of a parameter.

Figure 8:
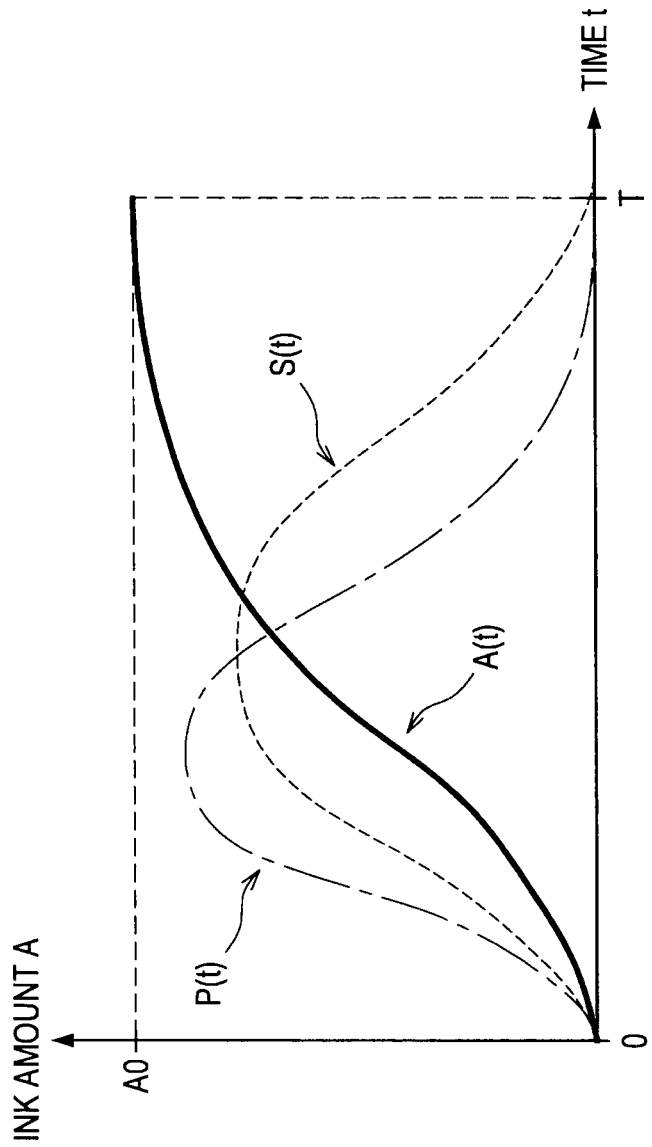
FIG. 8 is an explanatory diagram for describing the ink scoop-up operation according to the embodiment.

For example, assuming that an amount of ink A to be attached to the operating tool F per unit time is proportional to the area size S and the pressure P, the parameter calculation unit 105 calculates the amount of ink A assumed to have been scooped up and attached to the operating tool F based on the following formula (I). Additionally, the time the operating tool F contacted the ink object 10 is t=0, and the time the operating tool F was removed from the ink object IO is t=T. Also, the amount of ink assumed to have been attached to the operating tool F in the end by the scoop-up operation is expressed as A0. Additionally, the amount of ink A(t) assumed to have been attached to the operating tool F by the time t changes in the manner as shown in FIG. 8. The amount of ink A0 calculated by the parameter calculation unit 105 in this manner is recorded in the storage unit 106.

[Math. 1]

$$A0 \propto \int_0^T S(t)P(t)dt \quad (1)$$

In the foregoing, the ink scoop-up operation according to the present embodiment has been described. By determining the amount of ink to be scooped up based on the contact area size of the operating tool F and the pressure of the operating tool F as described above, ink can be virtually attached to the operating tool F just as if one is actually scooping up the ink with his/her finger. Also, since the amount of ink to be attached to the operating tool F is determined by only the scoop-up operation, scooping up of ink is completed by one operation. That is, the parameter, amount of ink, can be specified by one process by an intuitive operation.

[1-4: Drawing Operation]

Next, a drawing operation by an ink-laden operating tool F will be described with reference to FIGS. 9 to 17. As described above, in the drawing application according to the present embodiment, an operation method of attaching ink to the operating tool F and drawing a picture in the drawing area DA is adopted. Particularly, the drawing application according to the present embodiment has one characteristic in an operation method of drawing a picture in the drawing area DA with an operating tool F to which ink is virtually attached. Accordingly, in the following, a drawing operation of drawing a picture in the drawing area DA with an operating tool F to which ink is attached will be described in detail.

(Density Change According to Ink Amount)

Figure 9:
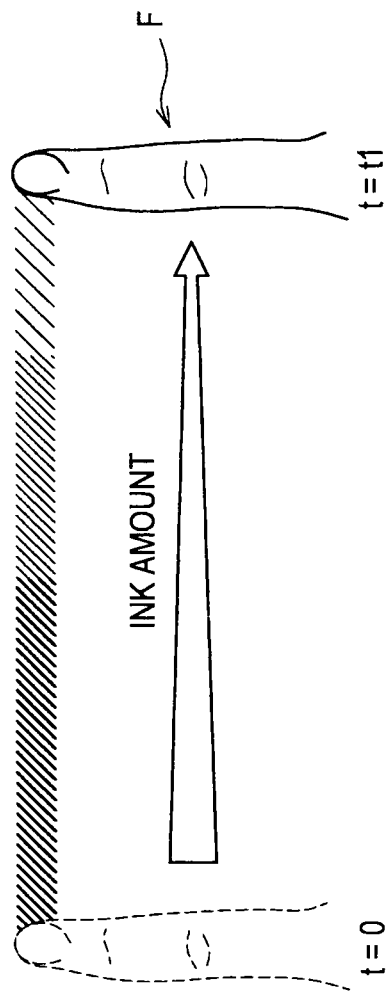
FIG. 9 is an explanatory diagram for describing a drawing operation according to the embodiment.

First, FIG. 9 will be referred to. In the drawing application according to the present embodiment, a line can be drawn by sweeping across the drawing area DA with the ink-laden operating tool F (for example, see FIG. 2). Additionally, in the case of the present embodiment, the amount of ink attached to the operating tool F decreases according to the length of the line drawn by the operating tool F. Then, when the amount of ink attached to the operating tool F becomes less, the density of the line drawn in the drawing area DA changes to become less, as shown in FIG. 9. In the following, an explanation will be given taking the operation of drawing a line as an example, for the sake of explanation.

When the operation of drawing a line with the operating tool F starts, an area size of contact between the drawing area DA and the operating tool F is detected by the area size detection unit 103. Then, area size information indicating the area size detected by the area size detection unit 103 is input to the parameter calculation unit 105. Also, when the operation of drawing a line with the operating tool F starts, the pressure detection unit 104 detects pressure of the operating tool F pressing the drawing area DA. Then, pressure information indicating the pressure detected by the pressure detection unit 104 is input to the parameter calculation unit 105. Furthermore, when the position of the operating tool F is detected by the position detection unit 102, position information indicating the position is input to the parameter calculation unit 105.

Figure 10:
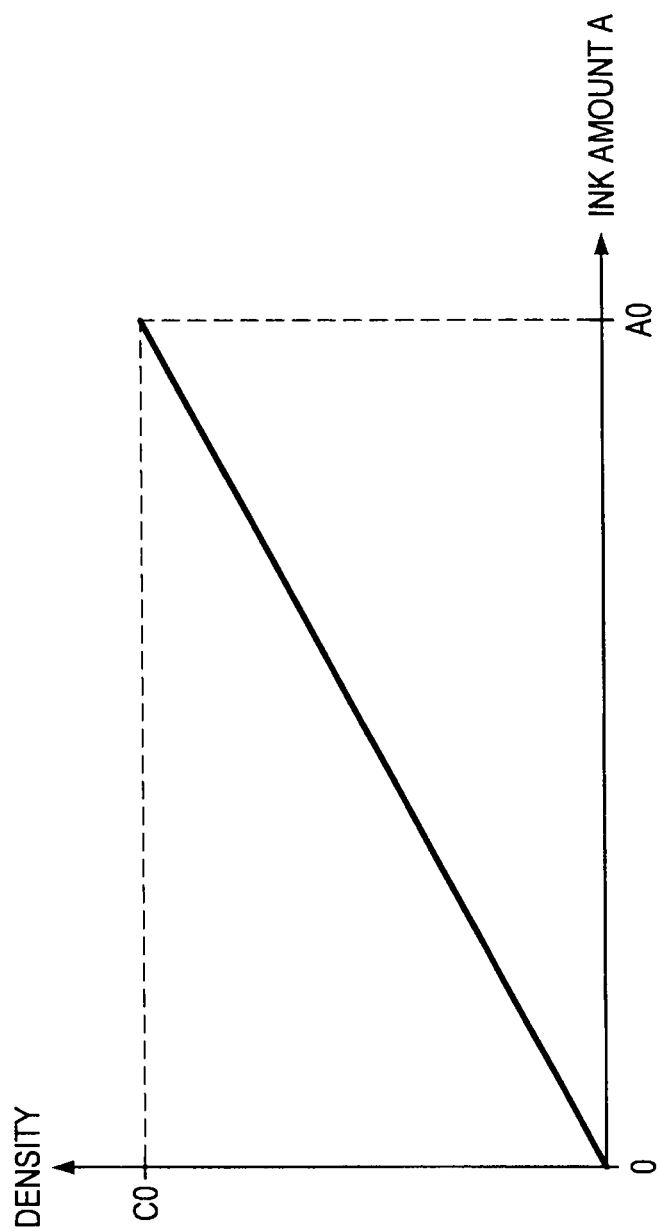
FIG. 10 is an explanatory diagram for describing the drawing operation according to the embodiment.

When the drawing operation by the operating tool F starts, the parameter calculation unit 105 reads the amount of ink A0 recorded in the storage unit 106. Then, the parameter calculation unit 105 calculates density C0 according to the amount of ink A0. For example, the relationship between amount of ink A and density C is set in the manner as shown in FIG. 10. As shown in FIG. 10, the larger the amount of ink A, the higher the density C. Additionally, in the example of FIG. 10, the amount of ink A and the density C are set to have a linear relationship, but the amount of ink A and the density C may also be set to have a non-linear relationship. The density C0 calculated by the parameter calculation unit 105 in this manner is input to the display control unit 107.

Figure 11:
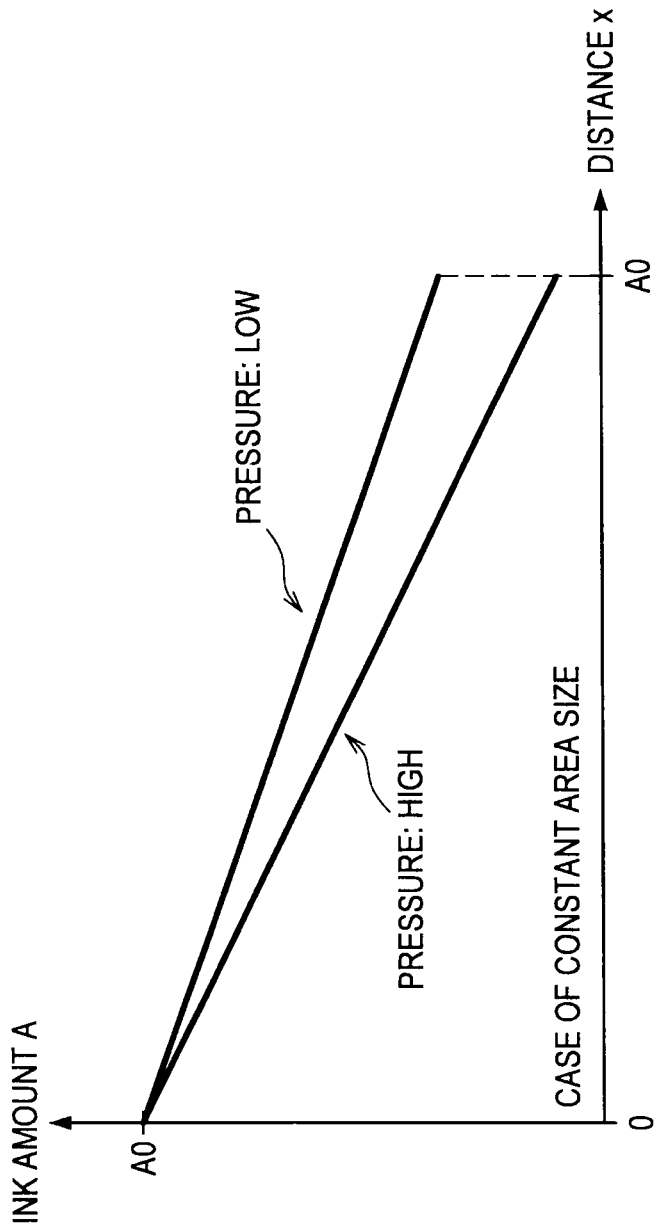
FIG. 11 is an explanatory diagram for describing the drawing operation according to the embodiment.
Figure 12:
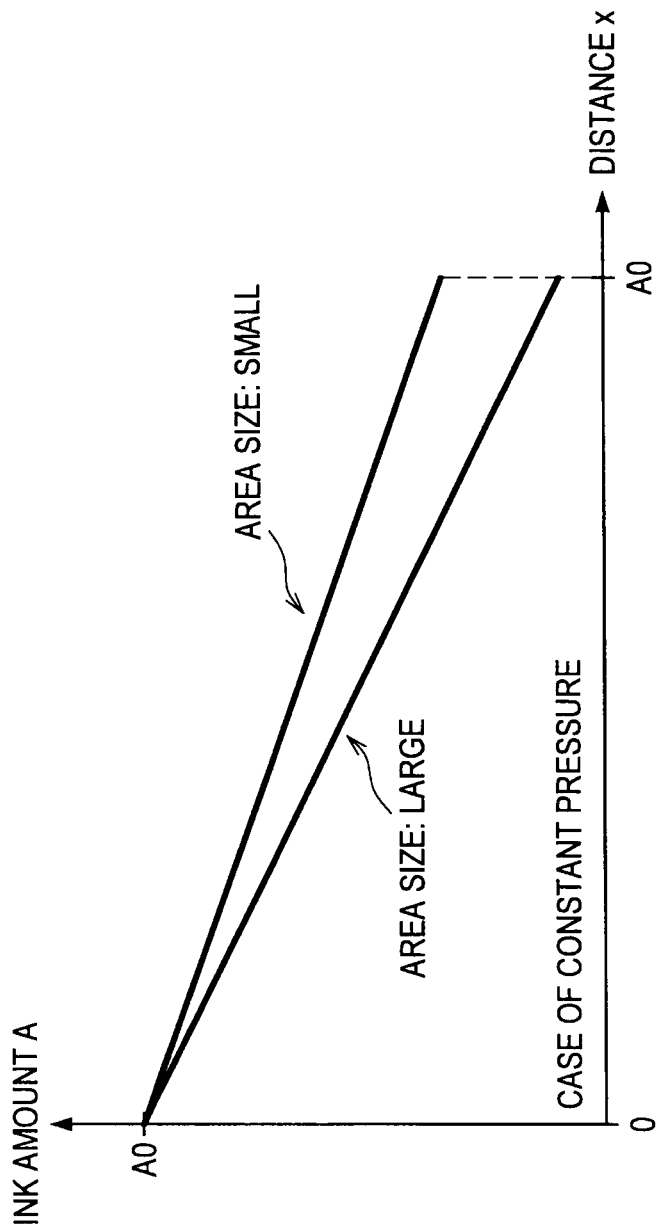
FIG. 12 is an explanatory diagram for describing the drawing operation according to the embodiment.

When the operating tool F moves, the display control unit 107 causes the display unit 101 to display a line with the density C0 input by the parameter calculation unit 105. Also, when the operating tool F moves, the parameter calculation unit 105 calculates a movement distance x of the operating tool F based on the position information input by the position detection unit 102. When the movement distance x is calculated, the parameter calculation unit 105 calculates the amount of ink A based on the calculated movement distance x. For example, as shown in FIGS. 11 and 12, the parameter calculation unit 105 decreases the amount of ink A as the movement distance x becomes greater. At this time, the parameter calculation unit 105 calculates the amount of ink A while taking into account the area size information input by the area size detection unit 103 and the pressure information input by the pressure detection unit 104.

For example, as shown in FIG. 11, when the area size detected by the area size detection unit 103 is constant, the parameter calculation unit 105 greatly decreases the amount of ink A as the pressure detected by the pressure detection unit 104 is higher. Also, as shown in FIG. 12, when the pressure detected by the pressure detection unit 104 is constant, the parameter calculation unit 105 greatly decreases the amount of ink A as the area size detected by the area size detection unit 103 is larger. That is, it is set such that the decrease amount of ink $\Delta A$ is greater as the pressure detected by the pressure detection unit 104 is greater and the decrease amount of ink $\Delta A$ is greater as the area size detected by the area size detection unit 103 is larger.

The parameter calculation unit 105 which has calculated the amount of ink A in this manner calculates the density C based on the calculated amount of ink A in the same manner as when calculating the density C0. The density C calculated by the parameter calculation unit 105 is input to the display control unit 107. When the operating tool F is further moved, the display control unit 107 causes the display unit 101 to display a line with the density C input by the parameter calculation unit 105. In this manner, calculation of the density C by the parameter calculation unit 105 and line display control by the display control unit 107 are repeatedly performed according to the movement of the operating tool F, and a line as shown in FIG. 9 is drawn.

In this manner, by performing display in such a way that the amount of ink A attached to the operating tool F decreases according to drawing of the line by the operating tool F and the density C of the line decreases according to the decrease in the amount of ink A, the strength of the line can be expressed as if one is actually drawing the line using a brush or the like.

(Density Change According to Movement Velocity)

Figure 13:
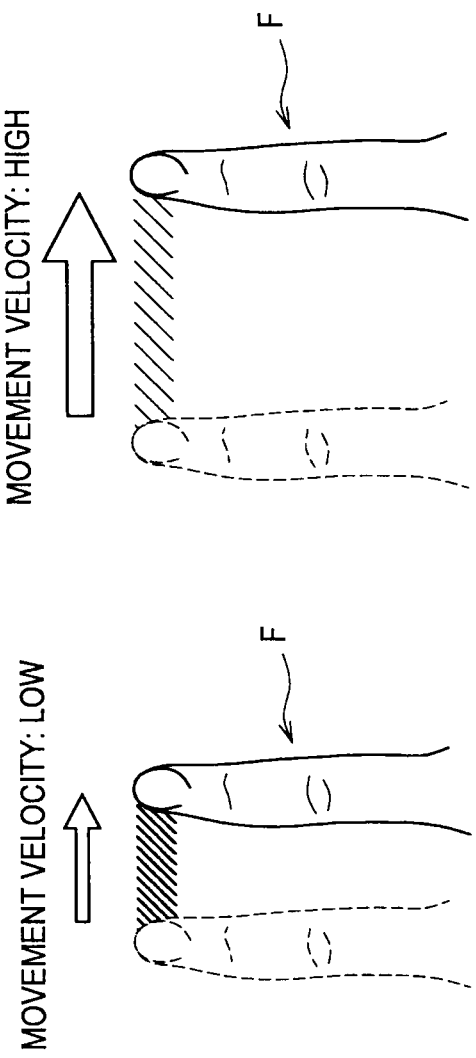
FIG. 13 is an explanatory diagram for describing the drawing operation according to the embodiment.

Next, FIG. 13 will be referred to. In the foregoing, no consideration has been given to a movement velocity V of the operating tool F. However, when actually drawing a line, if a brush is moved swiftly, the line will be light-coloured, and if the brush is moved slowly, the line will be dark-coloured. Accordingly, in the present embodiment, an operation system where the strength of a line changes according to the movement velocity V of the operating tool F is adopted, as shown in FIG. 13.

As described above, when the operating tool F moves, the position of the operating tool F is detected by the position detection unit 102, and position information indicating the position of the operating tool F is input to the parameter calculation unit 105. When the position information is input, the parameter calculation unit 105 calculates a movement velocity V of the operating tool F based on the input position information. Additionally, an expression, movement velocity, is used here, but in reality, only the speed of the movement (magnitude of the movement velocity) has to be calculated. The parameter calculation unit 105 which has calculated the movement velocity V calculates a density C based on the calculated movement velocity V. For example, the parameter calculation unit 105 calculates the density C based on the relationship between the movement velocity V and the density C as shown in FIG. 14.

Figure 14:
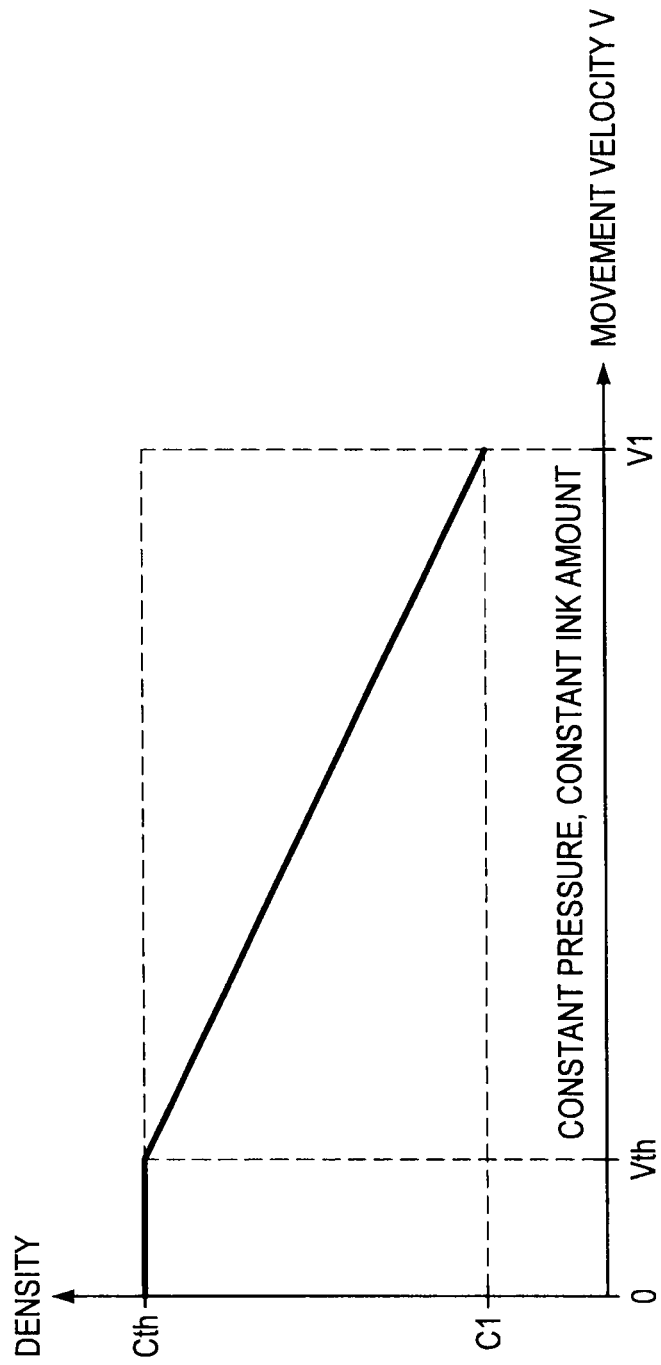
FIG. 14 is an explanatory diagram for describing the drawing operation according to the embodiment.

In the example of FIG. 14, it is set such that the density C is constant until the movement velocity V exceeds a predetermined threshold Vth, and the density C is decreased when the movement velocity V exceeds the predetermined threshold Vth. Additionally, the example of FIG. 14 shows a case where the area size S detected by the area size detection unit 103 and the pressure P detected by the pressure detection unit 104 are constant. In reality, the area size S, the pressure P, and the movement velocity V are each taken into account, and a density C in accordance with the area size S, the pressure P, and the movement velocity V is calculated by the parameter calculation unit 105. The density C calculated by the parameter calculation unit 105 is input to the display control unit 107. When the density C is input, the display control unit 107 causes the display unit 101 to display a line with the input density C.

Let us clarify here the relationship between the area size S, the pressure P, the movement velocity V, the amount of ink A, and the density C. As has been described, when the movement velocity V is constant, the density C is higher and the decrease amount of ink $\Delta A$ is greater as the pressure P is higher. Also, when the movement velocity V is constant, the decrease amount of ink $\Delta A$ is greater as the area size S is larger. Furthermore, when the movement velocity V is great, the density C is low, and the decrease amount of ink $\Delta A$ becomes smaller to that extent. That is, the density C can be expressed as $C=C(P, V, A)$. Also, the decrease amount of ink $\Delta A$ can be expressed as $\Delta A=\Delta A(C, S)$.

In this manner, by performing display in such a way that the amount of ink A attached to the operating tool F decreases according to the drawing of a line by the operating tool F and the density C of the line decreases according to the decrease in the amount of ink A, the strength of the line can be expressed as if one is actually drawing the line using a brush or the like. Furthermore, with the density C of the line being drawn changing according to the movement velocity, it becomes possible to approach the sense of actually drawing a line using a brush or the like.

(Thickness Change According to Contact Area Size)

Figure 15:
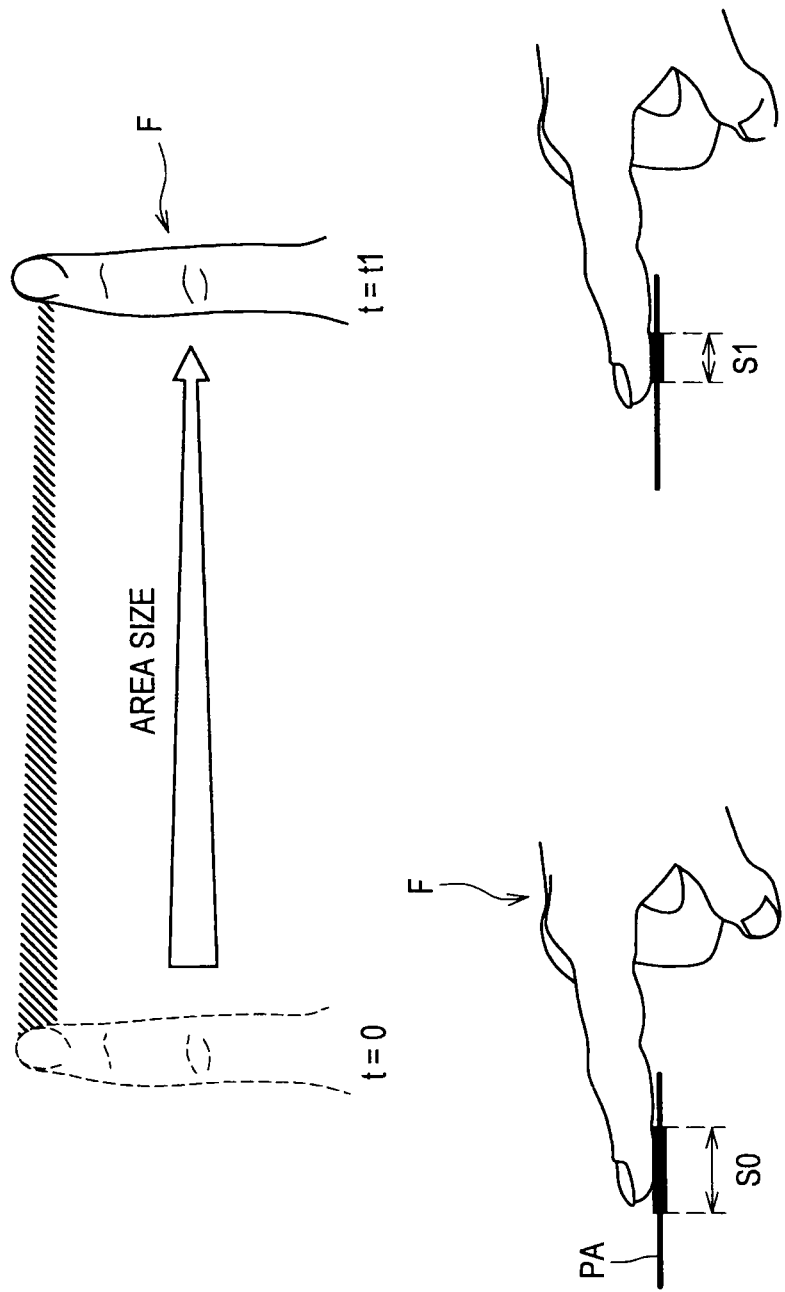
FIG. 15 is an explanatory diagram for describing the drawing operation according to the embodiment.

Next, FIG. 15 will be referred to. In the drawing application according to the present embodiment, the thickness of a line that is drawn changes according to the contact area size of the operating tool F. For example, as shown in FIG. 15, when the area size S of the operating tool F contacting the drawing area DA is large (S=S0), the line drawn in the drawing area DA is thick. On the other hand, when the area size S of the operating tool F contacting the drawing area DA is small (S=S1, S1<S0), the line drawn in the drawing area DA is thin. Accordingly, as shown in FIG. 15, a line that gradually becomes thin can be drawn by gradually reducing the area size S.

Now, when the operating tool F moves, the position of the operating tool F is input to the parameter calculation unit 105 by the position detection unit 102. Also, pieces of area size information indicating the area sizes S detected by the area size detection unit 103 are sequentially input to the parameter calculation unit 105. Furthermore, pieces of pressure information indicating the pressures P detected by the pressure detection unit 104 are sequentially input to the parameter calculation unit 105. Accordingly, when the area size S of the operating tool F contacting the drawing area DA changes, the parameter calculation unit 105 can detect the change in the area size S based on the pieces of area size information input by the area size detection unit 103.

Thus, when the area size S changes, the parameter calculation unit 105 calculates the thickness of a line that is according to the area size S. For example, the parameter calculation unit 105 assumes that the shape of the surface of contact between the operating tool F and the drawing area DA is round, and calculates the diameter of the circle from the area size S. Then, the parameter calculation unit 105 sets the calculated diameter of the circle to the thickness of a line. The thickness of a line calculated by the parameter calculation unit 105 in this manner is input to the display control unit 107. When the thickness of a line is input, the display control unit 107 causes the display unit 101 to display a line with the input thickness of a line. Additionally, the thickness of a line is an example of a parameter.

(Density Change According to Pressure)

Figure 16:
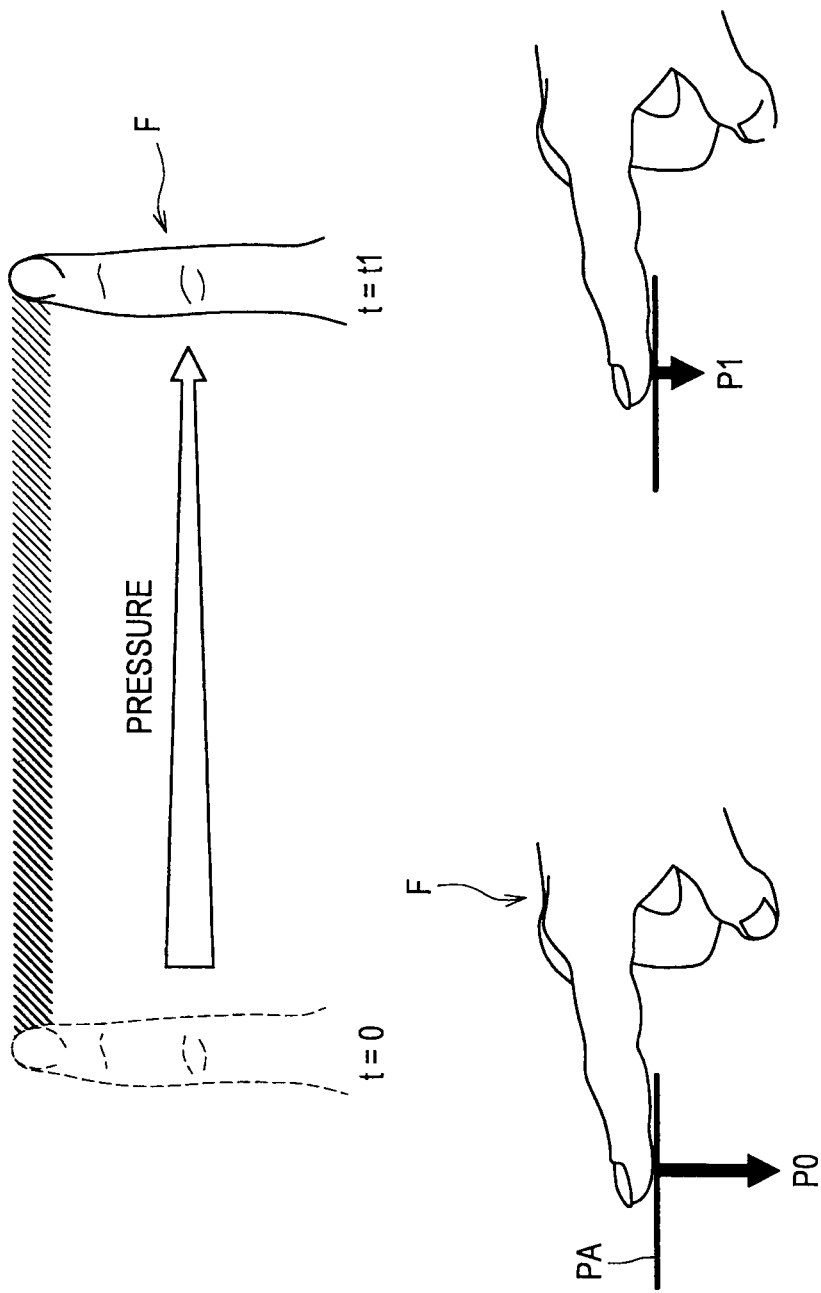
FIG. 16 is an explanatory diagram for describing the drawing operation according to the embodiment.

Next, FIG. 16 will be referred to. In the drawing application according to the present embodiment, the density of a line being drawn changes according to the pressure of the operating tool F. For example, as shown in FIG. 16, when the pressure P of the operating tool F pressing the drawing area DA is high (P=P0), the colour of the line drawn in the drawing area DA is dark. On the other hand, when the pressure P of the operating tool F pressing the drawing area DA is low (P=P1, P1<P0), the colour of the line drawn in the drawing area DA is light. Accordingly, as shown in FIG. 16, a line whose colour gradually becomes light can be drawn by gradually lowering the pressure P. If the pressure P is sufficiently lowered, a faded line can also be drawn.

Now, when the operating tool F moves, the position of the operating tool F is input to the parameter calculation unit 105 by position detection unit 102. Also, pieces of area size information indicating the area sizes S detected by the area size detection unit 103 are sequentially input to the parameter calculation unit 105. Furthermore, pieces of pressure information indicating the pressures P detected by the pressure detection unit 104 are sequentially input to the parameter calculation unit 105. Accordingly, when the pressure P of the operating tool F contacting the drawing area DA changes, the parameter calculation unit 105 can detect the change in the pressure P based on the pieces of pressure information input by the pressure detection unit 104.

Accordingly, when the pressure P changes, the parameter calculation unit 105 calculates a density C that is according to the pressure P. The density C calculated by the parameter calculation unit 105 is input to the display control unit 107. When the density C is input, the display control unit 107 causes the display unit 101 to display a line with the input density C. Additionally, the density C is an example of a parameter.

(Seeping Expression)

Next, FIG. 17 will be referred to. In the drawing application according to the present embodiment, seeping can be expressed by a press-down operation by a still operating tool F. As shown in FIG. 17, according to the operation method for expressing seeping, one has only to press the drawing area DA while holding the operating tool F still (Step. 1). When the drawing area DA is pressed, ink seeps through with the operating tool F as a reference point (Step. 2). Additionally, the ink may be made to seep in a substantially round shape centring on the position of the operating tool F, or may be made to seep in a random shape, for example.

Now, the still state of the operating tool F can be detected based on the position of the operating tool F detected by the position detection unit 102. For example, when the position of the operating tool F is not changed according to the position information input by the position detection unit 102, the parameter calculation unit 105 decides that the operating tool F is still. When a press-down operation is performed by the operating tool F in a still state, the parameter calculation unit 105 detects the press-down operation based on the pressure information input by the pressure detection unit 104. In this manner, when a press-down operation is performed by a still operating tool F, the parameter calculation unit 105 decides that an operation for expressing seeping is performed, and determines the range of seeping of ink. Additionally, the shape of the range of seeping may be a round shape or a random shape.

First, the parameter calculation unit 105 calculates the area size of the range of seeping according to the pressure P. Of course, the higher the pressure P, the larger the area size of the range of seeping. Next, the parameter calculation unit 105 determines the range of seeping based on the calculated area size. For example, when the shape of the range of seeping is round, the parameter calculation unit 105 calculates the radius of the circle based on the area size. In this case, the radius of the circle calculated by the parameter calculation unit 105 is input to the display control unit 107. When the radius of the circle is input as the information on the range of seeping, the display control unit 107 causes the display unit 101 to display a picture in such a way that ink is seeped through the area enclosed by a circle having the input radius and centring on the position of the operating tool F. At this time, the display control unit 107 may express the seeping of ink in such a way that the colour becomes light as it nears the boundary of the range of seeping.

In the foregoing, the drawing operation of an ink-laden operating tool F has been described. As described above, with the thickness or density of a line changing according to the movement velocity, the pressure and the contact area size of the ink-laden operating tool F, it becomes possible to draw as if one is actually drawing with a brush or the like. Also, since an operation step of displaying a menu screen for changing the thickness or density is unnecessary, a picture can be drawn with no stress with a small number of operation steps.

[1-5: Delete Operation]

Next, a delete operation of a picture by the operating tool F will be described with reference to FIG. 18. FIG. 18 is an explanatory diagram for describing a delete operation of a picture by the operating tool F.

A delete operation of a picture is performed after the delete mode button B1 (see FIG. 2) is pressed. When the delete mode button B1 is pressed by the operating tool F, transition is made to a delete mode. After transition is made to a delete mode, a picture is rubbed by the operating tool F and the rubbed portion of the picture is deleted. Additionally, as shown in FIG. 18, colour is completely deleted when rubbing is performed with the drawing area DA strongly pressed, but colour becomes light when rubbing is performed with the drawing area DA weakly pressed. That is, one has only to strongly rub a portion desired to be completely deleted, or weakly rub a portion where a lighter colour is desired. According to such a configuration, various expressions, such as grading or partial washing out, can be realized by controlling the pressure of the operating tool F In the foregoing, the delete operation of a picture by the operating tool F has been described.

<2: Example Application>

Next, an example application of the present embodiment will be described.

In the foregoing, explanation has been given specifically on a drawing application. However, an operation of scooping up a displayed object by the operating tool F can also be applied to other applications. For example, as shown in FIG. 19, application to a page-turning operation for a digital book or the like is possible. In the case of this application, a page can be turned by moving the operating tool F as if to scoop up a corner of the page (Step. 1). Additionally, a large number of pages are turned when an operation of strongly scooping up is performed, and a small number of pages are turned when an operation of weakly scooping up is performed (Step. 2). When the scoop-up operation is applied to a page-turning operation, the trouble of turning the pages one by one can be saved or an operation step of specifying the number of pages to be turned at one time can be omitted, for example, and a more intuitive page-turning operation with a small number of operation steps is realized.

Beside the above, application to an operation of cut and paste of a file is also possible. For example, a new operation system related to cut and paste can be realized by scooping up a file desired to be cut by the operating tool F (cut operation) and rubbing at the pasting position (paste operation). An issue is pointed out in the case of an electronic appliance which is not provided with input means such as a keyboard and with which input has to be performed using only a touch panel that, due to not being able to use shortcut keys of a keyboard, the cut and paste operation becomes bothersome to that extent. For example, a user has to newly display a menu screen to perform the cut and paste operation or the user has to memorise special gestures. However, introduction of a cut and paste operation adopting the scoop-up operation makes the operation intuitive and also enables to reduce the number of operation steps.

In the foregoing, an example application of the present embodiment has been described. In addition to the above, the scoop-up operation can be applied to various applications.

<3: Hardware Configuration>

The function of each structural element of the information processing apparatus 100 described above can be performed by using, for example, the hardware configuration of the information processing apparatus shown in FIG. 20. That is, the function of each structural element can be realized by controlling the hardware shown in FIG. 20 using a computer program. Additionally, the mode of this hardware is arbitrary, and may be a personal computer, a mobile information terminal such as a mobile phone, a PHS or a PDA, a game machine, or various types of information appliances. Moreover, the PHS is an abbreviation for Personal Handy-phone System. Also, the PDA is an abbreviation for Personal Digital Assistant.

As shown in FIG. 20, this hardware mainly includes a CPU 902, a ROM 904, a RAM 906, a host bus 908, and a bridge 910. Furthermore, this hardware includes an external bus 912, an interface 914, an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory.

The CPU 902 functions as an arithmetic processing unit or a control unit, for example, and controls entire operation or a part of the operation of each structural element based on various programs recorded on the ROM 904, the RAM 906, the storage unit 920, or a removal recording medium 928. The ROM 904 is means for storing, for example, a program to be loaded on the CPU 902 or data or the like used in an arithmetic operation. The RAM 906 temporarily or perpetually stores, for example, a program to be loaded on the CPU 902 or various parameters or the like arbitrarily changed in execution of the program.

These structural elements are connected to each other by, for example, the host bus 908 capable of performing high-speed data transmission. For its part, the host bus 908 is connected through the bridge 910 to the external bus 912 whose data transmission speed is relatively low, for example. Furthermore, the input unit 916 is, for example, a mouse, a keyboard, a touch panel, a button, a switch, or a lever. Also, the input unit 916 may be a remote control that can transmit a control signal by using an infrared ray or other radio waves.

The output unit 918 is, for example, a display device such as a CRT, an LCD, a PDP or an ELD, an audio output device such as a speaker or headphones, a printer, a mobile phone, or a facsimile, that can visually or auditorily notify a user of acquired information. Moreover, the CRT is an abbreviation for Cathode Ray Tube. The LCD is an abbreviation for Liquid Crystal Display. The PDP is an abbreviation for Plasma Display Panel. Also, the ELD is an abbreviation for Electro-Luminescence Display.

The storage unit 920 is a device for storing various data. The storage unit 920 is, for example, a magnetic storage device such as a hard disk drive (HDD), a semiconductor storage device, an optical storage device, or a magneto-optical storage device. The HDD is an abbreviation for Hard Disk Drive.

The drive 922 is a device that reads information recorded on the removal recording medium 928 such as a magnetic disk, an optical disk, a magneto-optical disk, or a semiconductor memory, or writes information in the removal recording medium 928. The removal recording medium 928 is, for example, a DVD medium, a Blu-ray medium, an HD-DVD medium, various types of semiconductor storage media, or the like. Of course, the removal recording medium 928 may be, for example, an electronic device or an IC card on which a non-contact IC chip is mounted. The IC is an abbreviation for Integrated Circuit.

The connection port 924 is a port such as an USB port, an IEEE1394 port, a SCSI, an RS-232C port, or a port for connecting an externally connected device 930 such as an optical audio terminal. The externally connected device 930 is, for example, a printer, a mobile music player, a digital camera, a digital video camera, or an IC recorder. Moreover, the USB is an abbreviation for Universal Serial Bus. Also, the SCSI is an abbreviation for Small Computer System Interface.

The communication unit 926 is a communication device to be connected to a network 932, and is, for example, a communication card for a wired or wireless LAN, Bluetooth (registered trademark), or WUSB, an optical communication router, an ADSL router, or a modem for various types of communication. The network 932 connected to the communication unit 926 is configured from a wire-connected or wirelessly connected network, and is the Internet, a home-use LAN, infrared communication, visible light communication, broadcasting, or satellite communication, for example. Moreover, the LAN is an abbreviation for Local Area Network. Also, the WUSB is an abbreviation for Wireless USB. Furthermore, the ADSL is an abbreviation for Asymmetric Digital Subscriber Line.

<4: Summary>

Lastly, the technical contents according to the embodiment of the present disclosure will be briefly described. The technical contents stated here can be applied to various information processing apparatuses such as a personal computer, a mobile phone, a portable game machine, a portable information terminal, an information appliance or a car navigation system, for example.

The functional configuration of the information processing apparatus described above can be expressed as below. This information processing apparatus includes a position detection unit, an area size detection unit, a pressure detection unit, and a parameter setting unit as below. The position detection unit is means for detecting a contact position of an operating tool which has contacted a screen. The area size detection unit is means for detecting a contact area size of the operating tool which has contacted the screen. The pressure detection unit is means for detecting a pressure of the operating tool pressing the screen. The parameter setting unit is means for setting, according to the contact area size of the operating tool on an object for parameter setting displayed on the screen and the pressure of the operating tool pressing the object, a size of a parameter associated with the object.

By enabling setting of a parameter while taking both the contact area size and the magnitude of the pressure into account as described above, it becomes possible to set a parameter in accordance with the amount of displayed object that is virtually scooped up according to an action of scooping up the displayed object on a screen. In this manner, by applying the technology according to the present embodiment, the action of "scooping up" which was not taken into consideration in the past in relation to an electronic appliance can be embedded in an operation system, and a more intuitive operation system can be realized. Also, a difference between natural actions such as an action of "rubbing" and an action of "wiping," in addition to the action of "scooping up," can be reflected on the processing result.

(Notes)

The parameter calculation unit 105 described above is an example of a parameter setting unit. The display control unit 107 described above is an example of a drawing unit and a book display unit.

It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2010-192249 filed in the Japan Patent Office on Aug. 30, 2010, the entire content of which is hereby incorporated by reference.

What is claimed is:

1. An information processing apparatus comprising:
   one or more computer processors; and
   a non-transitory memory which stores instructions, which, when executed by the one or more computer processors, cause the one or more computer processors to
   detect a contact position of an operating tool which has contacted a screen;
   detect a contact area size of the operating tool which has contacted the screen;
   detect a pressure of the operating tool pressing the screen; and
   set, according to the contact area size of the operating tool on an object displayed on the screen and the pressure of the operating tool pressing the object, an amount of ink assumed to have been attached to the operating tool, wherein
   the object is provided for each colour,
   the processor is further configured to draw, in a case the operating tool contacts a drawing area on the screen, a dot at a contact position of the operating tool with a density according to the amount of ink assumed to have been attached to the operating tool,
   the processor decreases the amount of ink assumed to have been attached to the operating tool every time a dot is drawn by the drawing unit, and
   the processor decreases the density of a dot to be drawn in the drawing area every time the amount of ink assumed to have been attached to the operating tool is decreased.

2. The information processing apparatus according to claim 1,
   wherein the instructions cause the one or more computer processors to set the amount of ink assumed to have been attached to the operating tool to be larger as the contact area size of the operating tool on the object is larger and set the amount of ink assumed to have been attached to the operating tool to be larger as the pressure of the operating tool pressing the object is higher.

3. The information processing apparatus according to claim 2,
   wherein the instructions cause the one or more computer processors to set, as the amount of ink assumed to have been attached to the operating tool, an amount proportional to an integral value I obtained by integrating, with respect to a time t during which the object is being contacted, a product S(t)*P(t) of a contact area size S(t) of the operating tool on the object and a pressure P(t) of the operating tool pressing the object.

4. The information processing apparatus according to claim 1,
   wherein the instructions cause the one or more computer processors to make the dot to be drawn in the drawing area larger as the contact area size of the operating tool is larger and increase the density of the dot to be drawn in the drawing area as the pressure of the operating tool is higher, and
   wherein the instructions cause the one or more computer processors to greatly decrease the amount of ink assumed to have been attached to the operating tool as the dot drawn in the drawing area is larger and greatly decrease the amount of ink assumed to have been attached to the operating tool as the dot drawn in the drawing area is denser.

5. The information processing apparatus according to claim 4,
   wherein the instructions cause the one or more computer processors to decrease the density of the dot to be drawn in the drawing area as a speed of movement of the operating tool is greater.

6. The information processing apparatus according to claim 5,
   wherein, in addition to the object provided for each colour, an object for deleting the dot drawn in the drawing area is provided on the screen, and
   wherein, in a case the operating tool contacts the dot drawn in the drawing area after the operating tool contacts the object for deleting the dot, the instructions cause the one or more computer processors to lighten a colour of the dot at the contact position of the operating tool or delete the dot according to the pressure of the operating tool.

7. A parameter setting method performed by an information processing apparatus including circuitry configured to detect a contact position of an operating tool which has contacted a screen, detect a contact area size of the operating tool which has contacted the screen, and detect a pressure of the operating tool pressing the screen, comprising:

setting, according to the contact area size of the operating tool on an object displayed on the screen and the pressure of the operating tool pressing the object, an amount of ink assumed to have been attached to the operating tool;

drawing, in a case the operating tool contacts a drawing area on the screen, a dot at a contact position of the operating tool with a density according to the amount of ink assumed to have been attached to the operating tool;

decreasing the amount of ink assumed to have been attached to the operating tool every time a dot is drawn by the drawing unit; and decreasing the density of a dot to be drawn in the drawing area every time the amount of ink assumed to have been attached to the operating tool is decreased, wherein the object is provided for each colour.

8. A non-transitory computer-readable storage medium storing computer-readable instructions thereon, which, when executed by a computer, cause the computer to perform a method comprising:

detecting a contact position of an operating tool which has contacted a screen;

detecting a contact area size of the operating tool which has contacted the screen;

detecting a pressure of the operating tool pressing the screen; and setting, according to the contact area size of the operating tool on an object displayed on the screen and the pressure of the operating tool pressing the object, an amount of ink assumed to have been attached to the operating tool;

drawing, in a case the operating tool contacts a drawing area on the screen, a dot at a contact position of the operating tool with a density according to the amount of ink assumed to have been attached to the operating tool;

decreasing the amount of ink assumed to have been attached to the operating tool every time a dot is drawn by the drawing unit; and decreasing the density of a dot to be drawn in the drawing area every time the amount of ink assumed to have been attached to the operating tool is decreased, wherein the object is provided for each colour.

\* \* \* \* \*